United States Patent [19]

Gallagher et al.

[11] Patent Number: 5,453,740

[45] Date of Patent: Sep. 26, 1995

[54] VEHICLE COLLISION PREVENTION SYSTEM USING THE DOPPLER EFFECT

[76] Inventors: Phillip M. Gallagher, 13651 Ninishew Rd., Magalia, Calif. 95954; James N. Hess, 591 Bille Rd., Paradise, Calif. 95969

[21] Appl. No.: 216,343

[22] Filed: Mar. 23, 1994

[51] Int. Cl.$^6$ ..................................................... G08G 1/16
[52] U.S. Cl. ........................ 340/903; 340/436; 340/693; 367/94
[58] Field of Search ...................................... 340/435, 436, 340/903, 904, 554, 693; 367/909, 94; 342/70

[56] References Cited

U.S. PATENT DOCUMENTS

| | | | |
|---|---|---|---|
| 5,087,918 | 2/1992 | May et al. | 340/435 X |
| 5,339,075 | 8/1994 | Abst et al. | 340/903 |

*Primary Examiner*—Jeffery A. Hofsass

[57] ABSTRACT

A vehicle collision prevention system for preventing a source vehicle from colliding with an obstruent object comprising detection circuitry adapted for detecting and providing an indication of an impending collision with an obstruent object, the detection circuitry further comprising transmission circuitry adapted to transmit a preselected reference signal with a known frequency; reception circuitry adapted to receive a modulated reference signal reflected from an obstruent object; compensation circuitry adapted to receive environmental inputs external to the source vehicle and provide a measure of source vehicle velocity; processor circuitry coupled to the transmission circuitry, reception circuitry, and compensation circuitry, the processor circuitry adapted to control and monitor the transmission and reception of a reference signal, calculate its propagation time to and from an obstruent object, and determine its reflected strength, determine the approximate propagation velocity of the reference signal and obstruent object with respect to the environmental inputs, determine the frequency of the reflected reference signal based upon the Doppler effect, and determine the approximate distance to the obstruent object based upon the reflected reference signal frequency, signal strength and propagation velocity and generate a distance signal indication; indication circuitry coupled to the detection circuitry and adapted for providing an indication of the distance to the obstruent object based on distance signal indications; and a energizing mechanism for energizing the detection circuitry and indication circuitry.

1 Claim, 5 Drawing Sheets

VEHICLE COLLISION PREVENTION SYSTEM USING THE DOPPLER EFFECT

BACKGROUND OF THE INVENTION

1. Field of the Invention

The present invention relates to a vehicle collision prevention system and more particularly pertains to preventing a source vehicle from colliding with an obstruent object with a vehicle collision prevention system.

2. Description of the Prior Art

The use of vehicular collision warning systems is known in the prior art. More specifically, vehicular collision warning systems heretofore devised and utilized for the purpose of preventing collisions are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,916,450 to Davis discloses a radar system for headway control of a vehicle. U.S. Pat. No. 4,949,088 to Ryan et al. discloses a system for identifying distance and range between a radar source and a vehicle. U.S. Pat. No. 5,026,153 to Suzuki et al. discloses a vehicle tracking control for continuously detecting the distance and direction to a preceding vehicle irrespective of background dark/light distribution. U.S. Pat. No. 5,045,856 to Paoletti discloses a vehicular anti-collision radar system for driving in the fog. U.S. Pat. No. 5,091,726 to Shyu discloses a vehicle anti-collision system.

While these devices fulfill their respective, particular objective and requirements, the aforementioned patents do not describe a vehicle collision prevention system that utilizes Doppler translation in combination with environmental inputs for preventing vehicles for colliding with obstruent objects.

In this respect, the vehicle collision prevention system according to the present invention substantially departs from the conventional concepts and designs of the prior art, and in doing so provides an apparatus primarily developed for the purpose of preventing a source vehicle from colliding with an obstruent object.

Therefore, it can be appreciated that there exists a continuing need for new and improved vehicle collision prevention system which can be used for preventing a source vehicle from colliding with an obstruent object. In this regard, the present invention substantially fulfills this need.

SUMMARY OF THE INVENTION

In the view of the foregoing disadvantages inherent in the known types of vehicular collision warning systems now present in the prior art, the present invention provides an improved vehicle collision prevention system. As such, the general purpose of the present invention, which will be described subsequently in greater detail, is to provide a new and improved vehicle collision prevention system and method which has all the advantages of the prior art and none of the disadvantages.

To attain this, the present invention essentially comprises a rigid and hollow container. A coupling mechanism is included and is adapted for coupling the container to the front windshield of a source vehicle. The coupling mechanism has a U-shaped bracket with a bottom portion pivotally coupled to the container and a top portion extending upwardly therefrom, a chuck coupled to the top portion of the bracket, an elongated and upwardly extending peg having a ball joint formed on one end with the ball joint disposed within the chuck for allowing the container to be rotated and angularly pivoted, a compression ring coupled around the peg for damping vibrational forces directed towards the container, an elongated base plate coupled to the peg remote from the ball joint, and a pair of upwardly extending suction cups coupled to base plate and adapted for coupling to a front windshield. Detection circuitry is included and is disposed in the container and adapted for detecting and providing an indication of an impending collision with an obstruent object. The detection circuitry further comprises transmission circuitry adapted to transmit a preselected reference signal with a known strength and frequency, receiving circuitry adapted to receive a degraded and modulated reference signal reflected from an obstruent object, compensation circuitry adapted to receive environmental inputs external to the source vehicle and provide a measure of source vehicle velocity, and processor circuitry coupled to the transmission circuitry, receiving circuitry, and compensation circuitry, the processor circuitry adapted to control and monitor the transmission and reception of a reference signal, calculate its propagation time to and from an obstruent object, and determine its reflected strength, determine the approximate propagation velocity of the reference signal and obstruent object with respect to the environmental inputs, determine the frequency of the reflected reference signal based upon the Doppler effect equation $F'=F(V \pm Vo/V \mp Vs)$, where $F'$ is the reflected reference signal frequency, $V$ is the propagation velocity of the reference signal, $Vo$ is the approximate velocity of the obstruent object, and $Vs$ is the approximate velocity of the source vehicle, and where the positive sign in the numerator of the equation is used when the source vehicle is moving toward the obstruent object and the negative sign is used when the source vehicle is moving away from the obstruent object, and the negative sign in the denominator is used when the obstruent object is moving away from the source vehicle and the positive sign is used when the obstruent object is moving toward the source vehicle, and determine the approximate distance to the obstruent object based upon the reflected reference signal frequency, signal strength and propagation velocity and generate a distance signal indication. Visual circuitry is included and is coupled to the processor circuitry and adapted for providing a visual indication of the distance to the obstruent object based on receipt of distance signal indications. The visual circuitry has a plurality of light sources arranged in sequence to define a range bar for representing impending collision distance. The range bar has an illuminated portion that grows in extent as the source vehicle moved closer to the obstruent object. Audio circuitry is included and is coupled to the processor circuitry adapted for providing an audible indication of distance to the object based on receipt of distance signal indications. The audio circuitry has a speaker adapted for producing a plurality of audible beeping sounds that increase in frequency as the source vehicle moves closer to the obstruent object. A power cable is included for energizing the detection circuitry, visual circuitry, and audio circuitry. The power cable has one end coupled to the detection circuitry, visual circuitry, and audio circuitry for transmitting power thereto and another end adapted to be coupled with a cigarette lighter socket of a source vehicle for receiving power therefrom. Fuse circuitry is coupled between the ends of the power cable for preventing excessive power from reaching the detection circuitry, visual circuitry, and audio circuitry. Switch means are coupled between the power cable and detection circuitry, visual circuitry, and audio circuitry with one orientation for activating the detection circuitry, visual circuitry, and audio circuitry when power is applied and another orientation for de-activating the detection circuitry, visual circuitry, and audio circuitry.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle collision prevention system which has all the advantages of the prior art vehicular collision warning systems and none of the disadvantages.

It is another object of the present invention to provide a new and improved vehicle collision prevention system which may be easily and efficiently manufactured and marketed.

It is a further object of the present invention to provide a new and improved vehicle collision prevention system which is of durable and reliable construction.

An even further object of the present invention is to provide a new and improved vehicle collision prevention system which is susceptible of a low cost of manufacture with regard to both materials and labor, and which accordingly is then susceptible of low prices of sale to the consuming public, thereby making such a vehicle collision prevention system economically available to the buying public.

Still yet another object of the present invention is to provide a new and improved vehicle collision prevention system which provides in the apparatuses and methods of the prior art some of the advantages thereof, while simultaneously overcoming some of the disadvantages normally associated therewith.

Even still another object of the present invention is to provide a new and improved vehicle collision prevention system for preventing a source vehicle from colliding with an obstruent object.

Lastly, it is an object of the present invention to provide a new and improved vehicle collision prevention system comprising detection circuitry adapted for detecting and providing an indication of an impending collision with an obstruent object, the detection circuitry further comprising transmission circuitry adapted to transmit a preselected reference signal with a known frequency; reception circuitry adapted to receive a modulated reference signal reflected from an obstruent object; compensation circuitry adapted to receive environmental inputs external to the source vehicle and provide a measure of source vehicle velocity; processor circuitry coupled to the transmission circuitry, reception circuitry, and compensation circuitry, the processor circuitry adapted to control and monitor the transmission and reception of a reference signal, calculate its propagation time to and from an obstruent object, and determine its reflected strength, determine the approximate propagation velocity of the reference signal and obstruent object with respect to the environmental inputs, determine the frequency of the reflected reference signal based upon the Doppler effect, and determine the approximate distance to the obstruent object based upon the reflected reference signal frequency, signal strength and propagation velocity and generate a distance signal indication; indication circuitry coupled to the detection circuitry and adapted for providing an indication of the distance to the obstruent object based on distance signal indications; and means for energizing the detection circuitry and indication circuitry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 2:
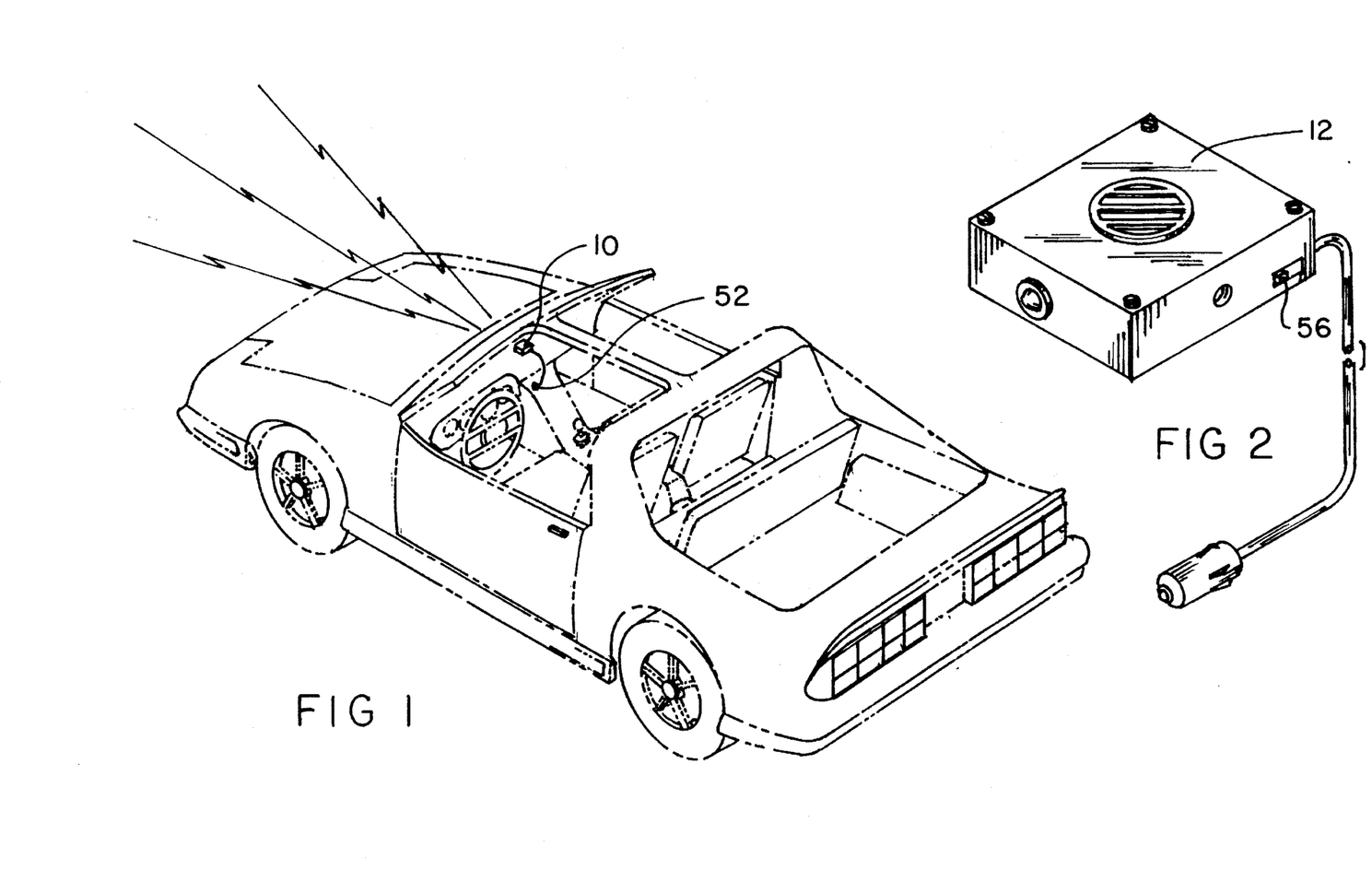
FIG. 1 is a perspective view of the preferred embodiment of the vehicle collision prevention system constructed in accordance with the principles of the present invention in operation with a source vehicle.
FIG. 2 is a perspective view of the vehicle collision prevention system constructed in accordance with the principles of the present invention.

With reference now to the drawings, and in particular, to FIG. 1 thereof, the preferred embodiment of the new and improved vehicle collision prevention system embodying the principles and concepts of the present invention and generally designated by the reference number 10 will be described.

Specifically, the present invention includes seven major components. The major components are the container, coupling mechanism, detection circuitry, visual circuitry, audio circuitry, power cable, and switch means. These components are interrelated to provide the intended function.

More specifically, it will be noted in the various Figures that the first major component is the container 12. The container is rigid in structure. It has a hollow portion adapted for holding electronic circuitry therein.

Figures 5, 6:
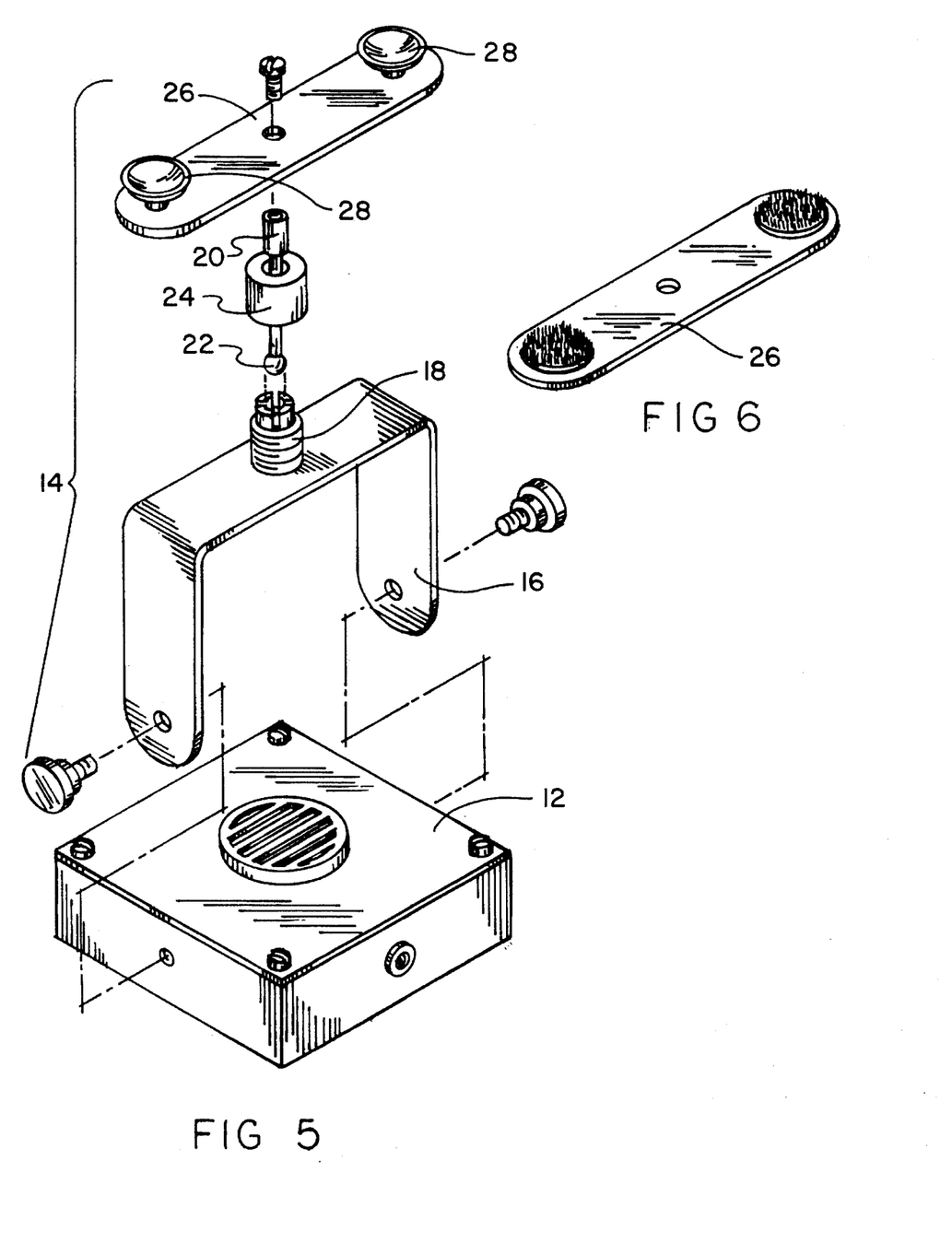
FIG. 5 is an exploded view of the coupling mechanism used to secure the present invention to the front windshield of a vehicle with suction cups.
FIG. 6 is a perspective view of an alternate base plate of the coupling mechanism used to secure the present invention to the roof of a vehicle near the front windshield with pile type fasteners.

The second major component is the coupling mechanism 14. The coupling mechanism is adapted for coupling the container to or near the front windshield of a source vehicle. The coupling mechanism has a U-shaped bracket 16 with a bottom portion and a top portion. The bottom portion is pivotally coupled to the container 12, thereby allowing the pitch of the container to be adjusted. The top portion extends upwardly from the bottom portion. A chuck 18 is coupled to the top portion of the bracket. The coupling mechanism includes a elongated and upwardly extending peg 20. The peg has a ball joint 22 formed on one end thereof. The ball joint is disposed within the chuck, whereby allowing the yaw, pitch, and roll of the container to be adjusted. A compression ring 24 is coupled around the peg. The compression ring is used for damping vibrational forces directed towards the container that could damage electrical components contained therein. An elongated base plate 26 is coupled to the end of the peg remote from the ball joint for providing a support for the mechanism. A pair of upwardly extending suction cups 28 are coupled to base plate. The suction cups are adapted for holding the coupling mechanism to a the front windshield of a vehicle. A pile type fastener such as velcro can also be coupled to the base plate in lieu of the suction cups. The velcro would be used to hold the coupling mechanism to the top of the roof of a vehicle near the front windshield. Alternatively, the container can be placed on or secured to the dashboard of a vehicle.

Figure 4:
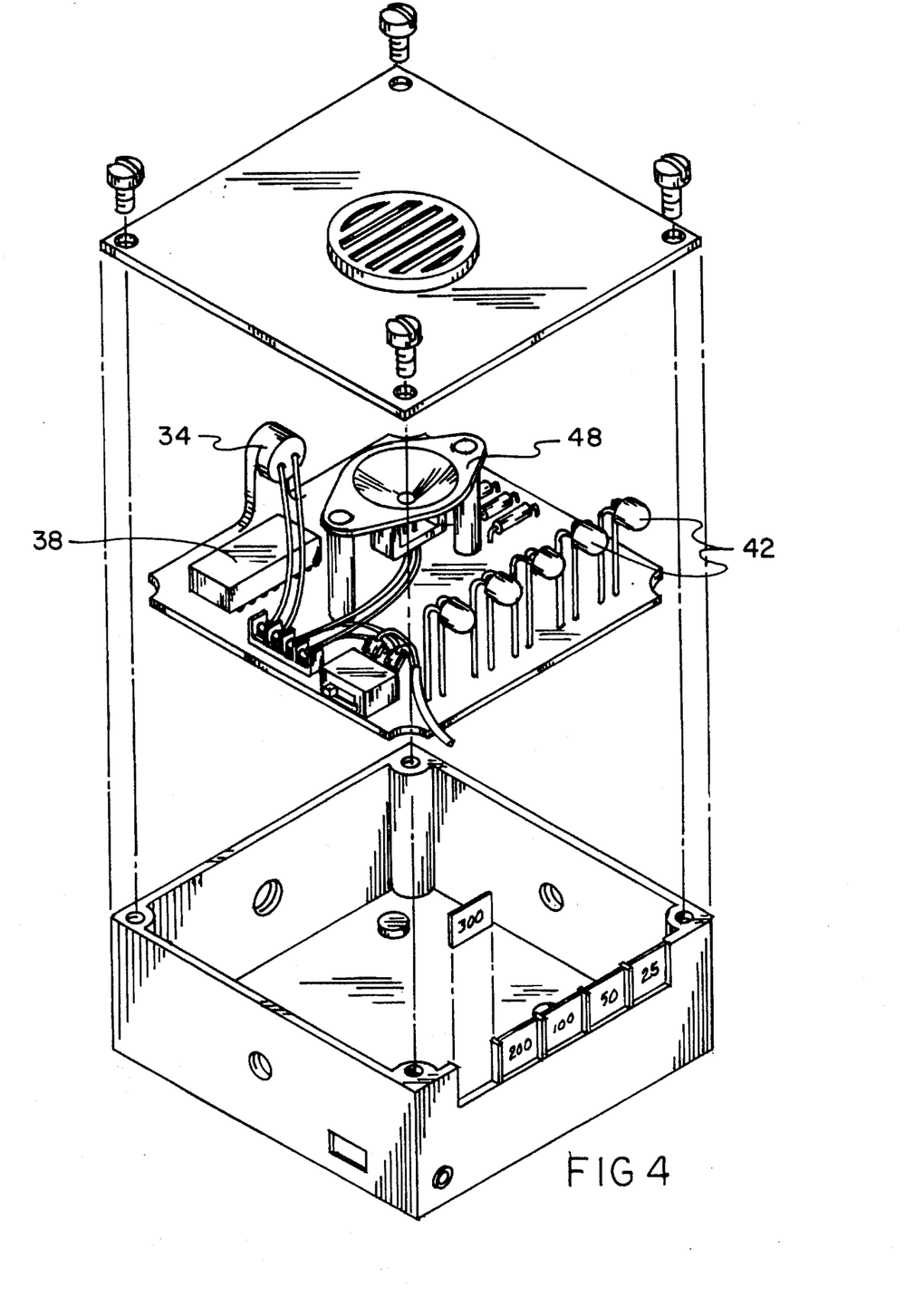
FIG. 4 is an exploded view of the container of the present invention depicting the detection circuitry, visual circuitry and audio circuitry disposed therein.
Figure 7:
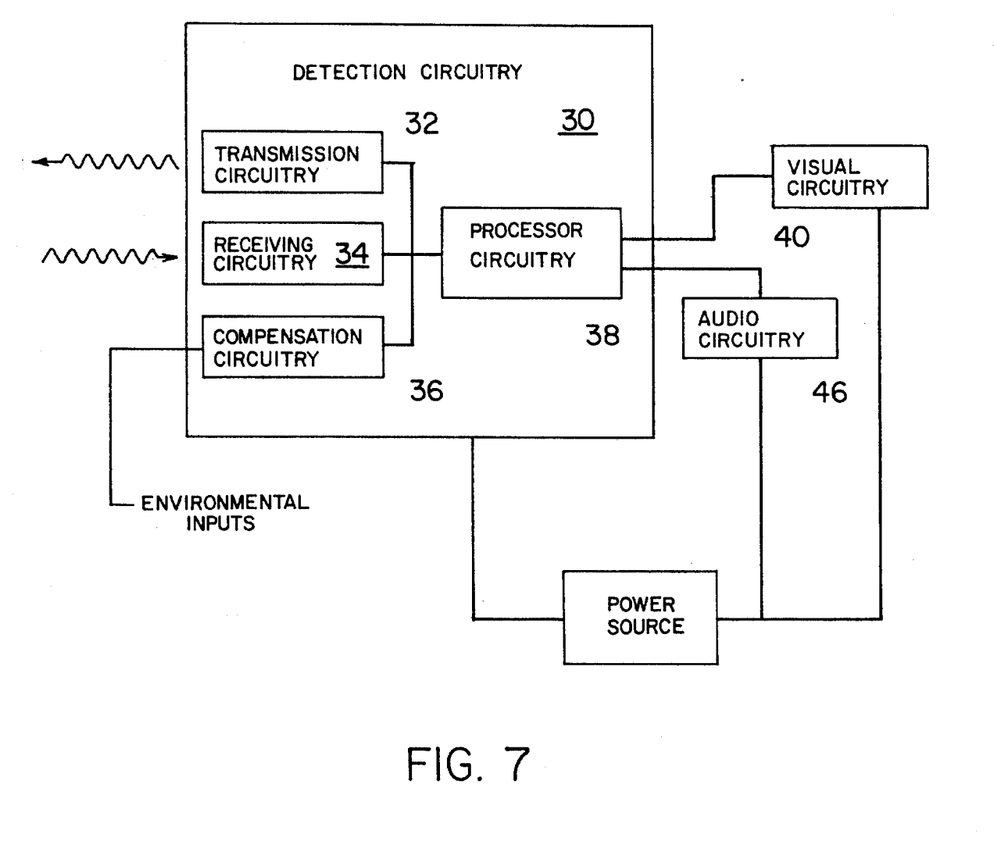
FIG. 7 is a functional block diagram of the detection circuitry, visual circuitry, and audio circuitry disposed within the container of the present invention.

The third major component is the detection circuitry 30. The detection circuitry is disposed in the container 12. The detection circuitry is adapted for detecting and providing an indication of an impending collision with an obstruent object. The detection circuitry includes four subcomponents. These subcomponents are related to provide the intended function.

The first subcomponent of the detection circuitry is the transmission circuitry 32. The transmission circuitry is adapted to transmit a preselected reference signal with a known strength and frequency. The transmission circuitry includes an oscillator, amplifier, and antenna.

The second subcomponent of the of the detection circuitry is the receiving circuitry 34. The receiver circuitry is adapted to receive a degraded and modulated reference signal reflected from an obstruent object. The receiver circuitry includes an antenna, pre-selector or mixer, converter, amplifier, and detector.

The third subcomponent of the of the detection circuitry is the compensation circuitry 36. The compensation circuitry is adapted to receive environmental inputs external to the source vehicle and provide a measure of source vehicle velocity. The compensation circuitry may include an accelerometer, speedometer, barometer, thermometer, hygrometer, or other similar devices designed to gather environmental data. This data may be utilized to calculate the propagation velocity of the reference signal in the atmosphere.

The fourth subcomponent of the of the detection circuitry is the processor circuitry 38. The processor circuitry is coupled to the transmission circuitry 32, receiving circuitry 34, and compensation circuitry 36. The processor circuitry is adapted to control and monitor the transmission and reception of a reference signal. The processor circuitry is also used to calculate the propagation time of the reference signal to and from an obstruent object. The processor circuitry is used to determine the reflected strength of the reference signal. The processor circuitry also determines the approximate propagation velocity of the reference signal and obstruent object with respect to the environmental inputs. The velocities can be calculated or be accessed using a resident look-up table indexed via the environmental inputs. The processor circuitry is then used to determine the frequency of the reflected reference signal based upon the Doppler effect equation $F'=F(V \pm Vo/V \mp Vs)$. Here, F' is the reflected reference signal frequency, V is the propagation velocity of the reference signal, Vo is the approximate velocity of the obstruent object, and Vs is the approximate velocity of the source vehicle. The positive sign in the numerator of the equation is used when the source vehicle is moving toward the obstruent object and the negative sign is used when the source vehicle is moving away from the obstruent object, and the negative sign in the denominator is used when the obstruent object is moving away from the source vehicle and the positive sign is used when the obstruent object is moving toward the source vehicle. Lastly, the processor circuitry is used to determine the approximate distance to the obstruent object based upon the reflected reference signal frequency, signal strength and propagation velocity and then generate a distance signal indication. The distance indication may be calculated based on previous and current input parameters or may be accessed with a resident look-up table.

The fourth major component is the visual circuitry 40. The visual circuitry is coupled to the processor circuitry. The visual circuitry is adapted for providing a visual indication of the distance to the obstruent object based on receipt of distance signal indications. The visual circuitry has a plurality of light sources 42 of the light-emitting diode type arranged in sequence to define a range bar 44. The range bar represents impending collision distance. The range bar has an illuminated portion that grows in extent as the source vehicle moves closer to the obstruent object.

The fifth major component is the audio circuitry 46. The audio circuitry is coupled to the processor circuitry. The audio circuitry is adapted for providing an audible indication of distance to the object based on receipt of distance signal indications. The audio circuitry includes a speaker 48. The speaker is adapted to produce a plurality of audible beeping sounds that increase in frequency as the source vehicle moves closer to the obstruent object.

Figure 3:
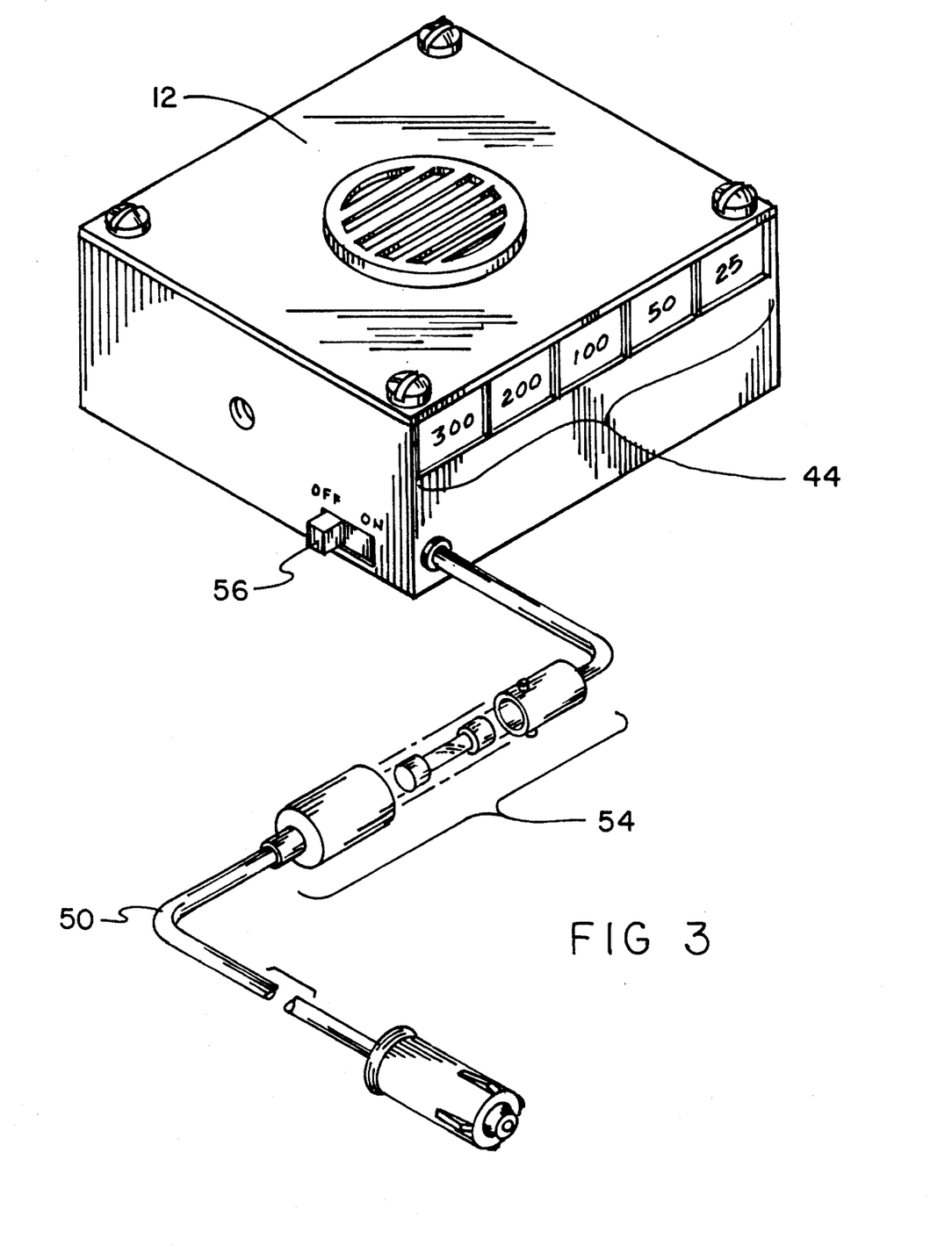
FIG. 3 is a perspective view of the present invention portraying an exploded view of the fuse circuitry of the power cable.

The sixth major component is the power cable 50. The power cable is used for energizing the detection circuitry 30, visual circuitry 40, and audio circuitry 46. The power cable has one end for transmitting power to the detection circuitry, visual circuitry, and audio circuitry. The power cable has another end adapted to be coupled with a cigarette lighter socket 52 of a source vehicle for receiving power therefrom. Fuse circuitry 54 is coupled between the ends of the power cable. The fuse circuitry prevents excessive power from reaching the detection circuitry, visual circuitry, and audio circuitry.

The seventh major component is the switch means 56. The switch means is coupled between the power cable and detection circuitry 30, visual circuitry 40, and audio circuitry 46. The switch means has one orientation for activating the detection circuitry when power is applied. The switch has another orientation for de-activating the detection circuitry, visual circuitry, and audio circuitry.

In the preferred embodiment, the present invention is mounted in the mid-dash area of a vehicle with a stationary dash mount or with a suction-on-glass windshield mount for most direct signal response. The unit is to be powered by any 12-volt source from the vehicle's battery, cigarette lighter, or fuse box with an end-line fuse on the power cord of the unit itself. The specific application and intent of this device is to respond to vehicles directly ahead when visibility becomes questionable, so as to prevent unforeseen collision.

The present invention lets a driver of a vehicle know if a vehicle or obstruent object is ahead when driving in the fog. It sends out a signal, the signal from the source vehicle bounces off a car which it is approaching and thus the driver could take preventive measure to avoid rear ending the vehicle. In this manner the driver is greatly aided in situations where visibility is nearly zero. Such situations are extremely dangerous and have led to multiple vehicle accidents with many deaths and injuries. A driver in such a situation is relatively helpless, as they must proceed ahead slowly, only seeing obstruent objects ahead at the last second, if at all. The present invention is activated during foggy situations to send out radar signals to let the driver know about what they cannot possibly see.

The device is primarily a single unit which houses both the signaling circuitry and the monitor. It is to be used for cars and motor cycles. However, when used with buses and trucks, because of their height, the circuitry and monitor are preferably separated, the signaling circuitry being located on the front bumper and the monitor in the cab.

The present invention is mounted on the dashboard, or on the windshield, sending out a radar signal when turned on. The driver is notified of an obstruent object or vehicle ahead by an audible beep and a range bar. The beeps get closer and closer together as the obstruent object gets closer to the unit, while the range bar graphically shows the distance to the obstruent object. The range bar of the visual circuitry indicates distances from about 25 feet to about 300 yards. The audible indicator signal changes corresponding to the input signal level. The audible alarm ranges from about 1 to 3 kHz. The alarm level ranges from about 110 to about 114 decibels.

The detector circuitry utilizes Doppler translation. As the obstruent object gets closer, the radar waves compress, and the frequency observed is higher than that of the source obstruent object. The transmission circuitry has a linear polarized E-vector horizontal antenna. The transmitted reference signal ranges from about 10.425 GHz to about 12.650 GHz. The frequency transmission pulse lock time ranges between 30 and 40 milliseconds. The present invention has a range of 25 feet to 300 yards, operating off of the vehicle's 12 volt battery.

The preferred embodiment weighs about 172 grams. It measures about five inches in width, five inches in length, and about two inches in height. Its operating temperature ranges from about −30° C. to about 85° C. The circuitry is designed to operate on a DC power source rated at about 11 volts to about 16 volts. The present invention may be stored at a temperature from about −40° C. to about 105° C. It is easily fastened in place with velcro or suction cups or placed on the dashboard of a vehicle using an integral stand coupled to its bottom. It has a speaker on its top, the range bar on the front face, and an on/off switch on the top right. The present invention is activated whenever desired. It can be used in light fog as well as heavy fog if the driver has any doubts about visibility.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicle collision prevention system for preventing a source vehicle from colliding with an obstruent object comprising, in combination:

a rigid and hollow container;

a coupling mechanism adapted for coupling the container to a front windshield of a source vehicle, the coupling mechanism having a U-shaped bracket with a bottom portion pivotally coupled to the container and a top portion extending upwardly therefrom, a chuck coupled to the top portion of the bracket, an elongated and upwardly extending peg having a ball joint formed on one end with the ball joint disposed within the chuck for allowing the container to be rotated and angularly pivoted, a compression ring coupled around the peg for damping vibrational forces directed towards the container, an elongated base plate coupled to the peg remote from the ball joint, and a pair of upwardly extending suction cups coupled to the base plate and adapted for coupling to the front windshield;

detection circuitry disposed in the container adapted for detecting and providing an indication of an impending collision with an obstruent object, the detection circuitry further comprising:

transmission circuitry adapted to transmit a preselected reference signal with a known strength and frequency;

receiving circuitry adapted to receive a degraded and modulated reference signal reflected from an obstruent object;

compensation circuitry adapted to receive environmental inputs external to the source vehicle and provide a measure of source vehicle velocity;

processor circuitry coupled to the transmission circuitry, receiving circuitry, and compensation circuitry, the processor circuitry adapted to control and monitor the transmission and reception of the reference signal, calculate its propagation time to and from an obstruent object, and determine its reflected strength, determine the approximate propagation velocity of the reference signal and obstruent object with respect to the environmental inputs, determine the frequency of the reflected reference signal based upon the Doppler effect equation $FN=F(V\pm Vo/V\mp Vs)$, where FN is the reflected reference signal frequency, V is the propagation velocity of the reference signal, Vo is the approximate velocity of the obstruent object, and Vs is the approximate velocity of the source vehicle, and where the positive sign in the numerator of the equation is used when the source vehicle is moving toward the obstruent object and the negative sign is used when the source vehicle is moving away from the obstruent object, and the negative sign in the denominator is used when the obstruent object is moving away from the source vehicle and the positive sign is used when the obstruent object is moving toward the source vehicle, and determine the approximate distance to the obstruent object based upon the reflected reference signal frequency, signal strength and propagation velocity and generate a distance signal indication;

visual circuitry coupled to the processor circuitry and adapted for providing a visual indication of the distance to the obstruent object based on receipt of distance signal indications, the visual circuitry having a plurality of light sources arranged in sequence to define a range bar for representing impending collision distance, the range bar having an illuminated portion that grows in extent as the source vehicle moved closer to the obstruent object;

audio circuitry coupled to the processor circuitry adapted for providing an audible indication of distance to the object based on receipt of distance signal indications, the audio circuitry having a speaker adapted for producing a plurality of audible beeping sounds that increase in frequency as the source vehicle moves closer to the obstruent object;

a power cable for energizing the detection circuitry, visual circuitry, and audio circuitry, the power cable having one end for transmitting power to the detection circuitry, visual circuitry, and audio circuitry and another end adapted to be coupled with a cigarette lighter socket of the source vehicle for receiving power, the power cable having fuse circuitry coupled between the ends thereof for preventing excessive power from reaching the detection circuitry, visual circuitry, and audio circuitry; and switch means coupled between the power cable and the detection circuitry, visual circuitry, and audio circuitry, the switch means having one orientation for activating the detection circuitry, visual circuitry, and audio circuitry when power is applied and another orientation for de-activating the detection circuitry, visual circuitry, and audio circuitry.

* * * * *